US012769822B2

(12) United States Patent
Gu et al.

(10) Patent No.: US 12,769,822 B2
(45) Date of Patent: Oct. 20, 2026

(54) DETERMINING PASSWORD STRENGTH BASED ON PERSONAL INFORMATION AND ACTIVITY

(71) Applicant: Gen Digital Inc., Tempe, AZ (US)

(72) Inventors: Lei Gu, Bedford, MA (US); Iskander Sanchez Rola, Mountain View, CA (US)

(73) Assignee: Gen Digital Inc., Tempe, AZ (US)

( * ) Notice: Subject to any disclaimer, the term of this patent is extended or adjusted under 35 U.S.C. 154(b) by 38 days.

(21) Appl. No.: 19/062,695

(22) Filed: Feb. 25, 2025

(65) Prior Publication Data

US 2026/0252680 A1 Aug. 27, 2026

(51) Int. Cl.
*G06F 21/46* (2013.01)

(52) U.S. Cl.
CPC .................................... *G06F 21/46* (2013.01)

(58) Field of Classification Search
CPC ...................................................... G06F 21/46
See application file for complete search history.

(56) References Cited

U.S. PATENT DOCUMENTS

| | | | |
|---|---|---|---|
| 9,749,299 | B1 | 8/2017 | Sokolov et al. |
| 9,788,160 | B1 | 10/2017 | Gu et al. |
| 9,794,744 | B1 | 10/2017 | Gu et al. |
| 9,882,889 | B1 | 1/2018 | Gu et al. |
| 9,883,339 | B1 | 1/2018 | Gu et al. |
| 10,032,033 | B2 | 7/2018 | Gu et al. |
| 10,061,916 | B1 | 8/2018 | Jiang et al. |
| 10,078,762 | B1 | 9/2018 | Gu et al. |
| 10,097,560 | B1 | 10/2018 | Shavell et al. |
| 10,204,499 | B1 | 2/2019 | Newstadt et al. |
| 10,206,110 | B1 | 2/2019 | Shavell et al. |
| 10,262,135 | B1 | 4/2019 | Gu et al. |
| 10,339,304 | B2 | 7/2019 | Gu et al. |
| 10,375,114 | B1 | 8/2019 | Gu et al. |
| 10,380,074 | B1 | 8/2019 | Gu et al. |
| 10,382,488 | B1 | 8/2019 | Gu et al. |
| 10,409,979 | B1 | 9/2019 | Gu et al. |
| 10,438,000 | B1 | 10/2019 | Gu et al. |
| 10,447,736 | B1 | 10/2019 | Jiang et al. |
| 10,462,184 | B1 | 10/2019 | Gu et al. |
| 10,693,998 | B1 | 6/2020 | Gu et al. |
| 10,706,167 | B1 | 7/2020 | Sokolov et al. |
| 10,725,870 | B1 | 7/2020 | Gu et al. |
| 10,742,665 | B2 | 8/2020 | Gu et al. |

(Continued)

*Primary Examiner* — Mohammad A Siddiqi
(74) *Attorney, Agent, or Firm* — Baratta Law PLLC; Lawrence A. Baratta, Jr.

(57) ABSTRACT

Systems and methods provide context-aware password strength evaluation. In an embodiment, a method includes receiving a user password, wherein the user password is associated with at least one of a newly created password, an updated password, or an existing password to be analyzed; parsing the user password into one or more segments; determining, for each segment, discoverability measures relative to personal information associated with the user, wherein the personal information includes at least one of publicly available data or non-public data; calculating a context-aware password strength rating based on the discoverability measures of the one or more segments; and providing feedback to the user regarding the context-aware password strength rating.

20 Claims, 5 Drawing Sheets

(56) References Cited

U.S. PATENT DOCUMENTS

| | | | |
|---|---|---|---|
| 10,783,261 B1 | 9/2020 | Gu et al. | |
| 10,810,088 B1 | 10/2020 | Gu et al. | |
| 10,810,089 B1 | 10/2020 | Gu et al. | |
| 10,887,339 B1 | 1/2021 | Sokolov et al. | |
| 10,924,496 B1 | 2/2021 | Gu et al. | |
| 10,942,816 B1 | 3/2021 | Gu et al. | |
| 10,966,050 B1 | 3/2021 | Gu et al. | |
| 11,030,150 B1 | 6/2021 | Sokolov et al. | |
| 11,124,195 B1 | 9/2021 | Gu et al. | |
| 11,184,169 B1 | 11/2021 | Sokolov et al. | |
| 11,216,559 B1 | 1/2022 | Gu et al. | |
| 11,218,868 B1 | 1/2022 | Gu et al. | |
| 11,449,637 B1 | 9/2022 | Sanchez Rola et al. | |
| 11,520,850 B1 | 12/2022 | Sanchez Rola | |
| 11,736,488 B1 | 8/2023 | Gu et al. | |
| 11,777,909 B1 | 10/2023 | Sanchez Rola et al. | |
| 11,829,438 B1 | 11/2023 | Sanchez Rola | |
| 11,849,002 B1 | 12/2023 | Sanchez Rola et al. | |
| 11,947,692 B1 | 4/2024 | Sanchez Rola et al. | |
| 11,949,679 B1 | 4/2024 | Sanchez Rola et al. | |
| 11,968,093 B1 | 4/2024 | Gu et al. | |
| 11,972,027 B1 | 4/2024 | Sanchez Rola et al. | |
| 12,013,952 B1 | 6/2024 | Sanchez Rola | |
| 12,014,386 B1 | 6/2024 | Sanchez Rola et al. | |
| 12,107,838 B1 | 10/2024 | Silva et al. | |
| 12,143,369 B1 | 11/2024 | Sanchez Rola | |
| 2009/0150971 A1* | 6/2009 | Vedula | H04L 9/0891 726/1 |
| 2013/0269010 A1* | 10/2013 | Wheeler | G06F 21/46 726/6 |
| 2018/0012014 A1* | 1/2018 | Sahin | G06F 21/577 |
| 2020/0021440 A1* | 1/2020 | Maniyar | G06F 21/46 |
| 2022/0131853 A1* | 4/2022 | Smith | H04L 63/0807 |
| 2023/0097984 A1 | 3/2023 | Rola | |
| 2023/0136383 A1 | 5/2023 | Kotzias et al. | |
| 2023/0325841 A1 | 10/2023 | Sanchez Rola et al. | |
| 2023/0376964 A1 | 11/2023 | Roundy et al. | |
| 2023/0403298 A1 | 12/2023 | Silva et al. | |

* cited by examiner

DETERMINING PASSWORD STRENGTH BASED ON PERSONAL INFORMATION AND ACTIVITY

FIELD OF THE DISCLOSURE

The present disclosure relates generally to computing. More particularly, the present disclosure relates to systems and methods for determining password strength based on a user's information and activity.

BACKGROUND OF THE DISCLOSURE

A password is a confidential string of characters—such as letters, numbers, and symbols—used to verify a user's identity when accessing a device, account, or system. Generally, the strength of a password depends on its complexity, length, and unpredictability. Users employ passwords daily for activities like logging into email, social media, and work-related systems, where the password acts as the front-line defense against unauthorized access. This is precisely why the concept of a "strong" password has emerged: as cyberattacks grow more sophisticated, weak or easily guessable passwords can be quickly compromised through tactics like brute force attacks and social engineering, putting personal and organizational data at risk. A strong password typically contains a mix of uppercase letters, lowercase letters, numbers, and special symbols. Longer passwords—often twelve characters or more—greatly increase security because they are more difficult to guess or crack. However, strength is not determined by length alone; predictable patterns or common words can weaken a password's effectiveness even if it contains multiple types of characters. For instance, passphrases, which use several words strung together, are increasingly recommended because they can offer both sufficient length and memorability. Another strong approach might involve replacing letters with special characters, interspersing numbers within words, or combining unrelated words into a single phrase.

BRIEF SUMMARY OF THE DISCLOSURE

Most people create passwords using familiar information—such as a spouse's or child's name and birthday, favorite sports teams, or beloved songs and artists—because these details are easy to remember. Although substituting characters (for instance, changing "o" to "0" or "S" to "$") can add a layer of complexity, a determined hacker can still exploit publicly available information to reduce the search space needed to crack such passwords. By building a connected graph from a user's known data—such as family names, important dates, sports affiliations, musical preferences, and artistic interests—an attacker can quickly generate a targeted password dictionary. For example, if someone's favorite football team is the New England Patriots, their favorite athlete is Tom Brady, they enjoy classical music composed by Mozart, and they admire Van Gogh's "Starry Night," these details can be combined and modified (with character substitutions) to guess an otherwise "creative" password. In other words, the widespread sharing of personal data—often via social media—means that even passwords containing symbolic substitutions may be vulnerable when adversaries draw from a well-connected set of publicly accessible personal details. Currently, there is no solution designed to evaluate a password's strength by cross-referencing this type of publicly shared information.

Determining password strength solely by traditional metrics—length, character diversity, and randomness—does not provide a fully accurate measure of security if it neglects a user's publicly available data. In today's AI-driven landscape, automated tools can rapidly sift through social media posts, professional profiles, and other online sources to build a "digital fingerprint" of someone's interests, family members, birthdays, and more. This targeted knowledge allows attackers to craft narrowed-down, highly effective guess lists or customized dictionaries. As a result, a password that appears strong by standard criteria (e.g., long and containing special characters) may still be compromised quickly if it is based on easily discovered personal details—such as a pet's name or a favorite sports team. When artificial intelligence is used to automate and accelerate these data-collection and pattern-recognition processes, the risk of account compromise grows significantly. Therefore, accurately assessing a password's resilience requires not only examining its intrinsic complexity, but also correlating it with personal details an attacker could gather from publicly accessible sources.

To address this gap, the present disclosure proposes determining password strength by analyzing a user's publicly available information and social media activities, including, for example, posts, images, audio, video, extended reality content, and Discord chats. By integrating these data points into a password strength metric, it becomes possible to identify whether a user's chosen credentials rely heavily on personal details, thereby enhancing cybersecurity and reducing the risk of compromise.

The present disclosure describes a context-aware approach to evaluating the strength of user passwords by examining both the password's intrinsic characteristics (e.g., length, character diversity) and the user's personal information (e.g., social media, private data, dark web leaks). The method begins by receiving a user password—whether newly created, updated, or existing—and parsing it into segments, which are then matched to user-specific data points in an information graph. Each data point has a difficulty score that reflects how publicly visible or obscure it is, potentially adjusted if it appears on compromised databases. A scoring model aggregates the difficulty measures to produce a final context-aware rating; if any segment is highly discoverable (e.g., a frequently mentioned sports team), the system recommends a more random or obscure alternative. Fuzzy matching handles partial substitutions, while automated checks can enforce a minimum threshold before accepting a password. The solution also contemplates storing the information graph locally or in a distributed fashion, and dynamically updating node scores based on newly discovered user data. Users receive real-time alerts and educational feedback on best practices to mitigate targeted, personalized attacks.

BRIEF DESCRIPTION OF THE DRAWINGS

The present disclosure is detailed through various drawings, where like components or steps are indicated by identical reference numbers for clarity and consistency.

DETAILED DESCRIPTION OF THE DISCLOSURE

Figure 1:
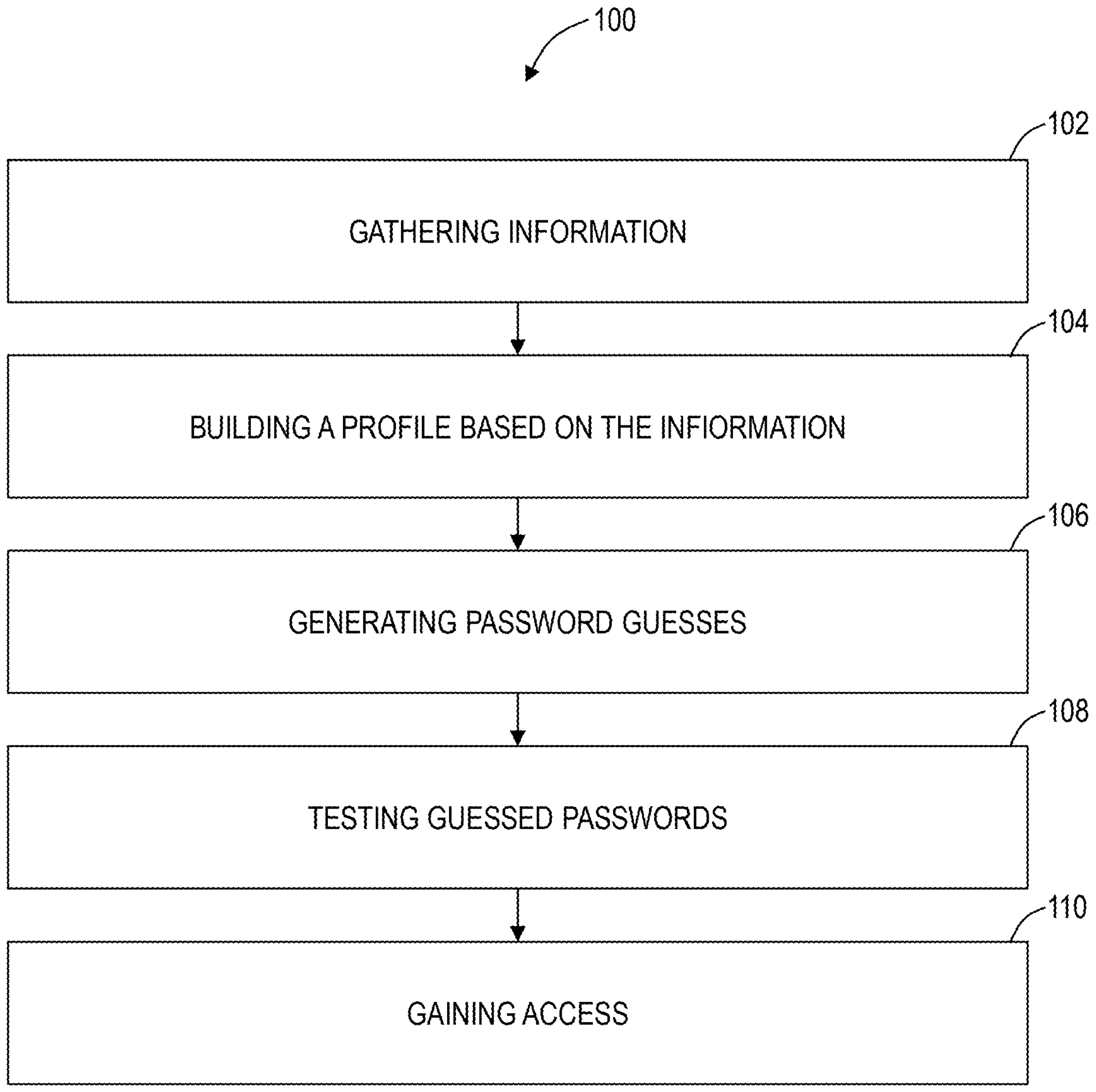
FIG. 1 illustrates a flowchart of a process for a malicious actor to guess a user's password and gain system access.

Again, the present disclosure relates to systems and methods for determining password strength based on a user's personal information and activity.

Strong Password

Today, a password's strength is assessed using a set of basic, largely automated criteria that focus on syntactic complexity rather than contextual or personal details. Key factors typically include:

(1) Length of the Password—Many enforce a minimum length (often 8-12 characters) and consider passwords "stronger" if they are longer. Longer passwords inherently require more computational effort to guess via brute force.

(2) Character Diversity—Sites frequently require a mix of uppercase letters, lowercase letters, numbers, and special symbols (e.g., @, #, $). The rationale is that a broader range of characters makes it harder to systematically guess a password.

(3) Common Password Avoid lists—Some systems check if a password is on a known list of compromised or common passwords (e.g., "password," "123456," "qwerty"). If a password appears on such a list, the system will reject it or warn the user that it's not secure.

(4) Repetitive/Sequential Characters—Many sites discourage or flag passwords that contain repetitive sequences (e.g., "aaaaaa") or keyboard sequences (e.g., "1234," "abcd").

(5) Entropy-Based Calculations—Some advanced password strength meters (such as zxcvbn) attempt to gauge a password's theoretical entropy—i.e., how many random bits of information it contains. This approach also accounts for common words, patterns, or dates, but only to a limited extent.

The assessment of the strength of a password typically occurs when a user establishes or changes a password. Alternatively, some password manager or vault programs can assess strength periodically. For feedback, users may see a color-coded meter (e.g., red to green), text descriptor ("Weak," "Good," "Strong"), or any other means of indicating strength. This feedback is based on how many criteria have been met—length, character variety, absence of common patterns, etc.

While these conventional methods do help prevent trivial passwords, they do not account for contextual information—like a user's publicly available details on social media or personal data easily gleaned from data breaches. Consequently, a password with good length and character mix but tied to a user's favorite sports team or pet's name can still appear "strong" to these checkers, even though it may be easily guessable by a determined attacker who knows the user's personal background.

How Passwords are Typically Created

Many individuals start with details they can easily recall—names, birthdays, favorite artists or sports teams, memorable dates, and even song lyrics. They believe incorporating these personal references helps them remember their passwords, yet it also makes those passwords more predictable. In an effort to strengthen these choices, users commonly substitute characters—changing an "o" to "0" or an "S" to "$"—thinking it renders the password more complex. While these adjustments may look stronger at a glance, most password checkers focus on length and character diversity but ignore the personal context behind the password. As a result, a checker might declare a password will take "1 billion years" to crack purely on the basis of permutations. In reality, if attackers discover that a user likes the New England Patriots or recently attended a Taylor Swift concert, they can craft targeted password guesses (e.g., "Patriots2023!" or "TSwiftLOver$") that are far easier to crack than the user realizes. This disparity between perceived complexity and actual vulnerability leads to a false sense of security, because the password is only strong against generic brute force—not an attack informed by personal data gleaned from social media, receipts, or other publicly available sources.

Malicious Actor

A malicious actor can take advantage of publicly available information, data breaches, and automated tools to build a robust profile of a target user and then systematically guess that user's password. FIG. 1 illustrates a flowchart of a process 100 for a malicious actor to guess a user's password and gain system access. The malicious actor is a person, entity, organization, etc. motivated to personal information, financial records, or intellectual property. The system can be online accounts (email, social media, cloud services, financial or e-commerce platforms), corporate systems (internal networks, databases, or administrative portals), devices (personal computers, servers, smartphones, or loT devices that require login credentials), and the like. Consequences of the malicious actor gaining access include data exfiltration, account hijacking and lateral movement, fraud, ransom, destruction, and the like.

First, the malicious actor gathers information (step 102). This can include gathering both public and non-public information. Gathering Public Information—Attackers often begin by scraping social media platforms—such as Facebook, Instagram, Twitter, TikTok, and LinkedIn—to collect easily discoverable personal details like birthdays, anniversaries, family members' names, pet names, and favorite sports teams or musicians. They methodically browse public posts, photos, videos, and friend lists, seeking memorable clues that could be used in passwords. In addition to social media, malicious actors may turn to data broker services that sell or distribute comprehensive datasets containing addresses, phone numbers, employment histories, and other biographical details, which can be correlated with the user's name or email address for deeper profile building. Hackers also scour leaked databases and breach dumps—often found on the dark web—for partial usernames, hashed or old passwords, and security questions; even outdated credentials can be invaluable since many people recycle or slightly modify passwords over time. Beyond these mainstream sources, attackers look for miscellaneous clues in blogs, review sites like Amazon and Goodreads, online community forums, or older profiles the user may have forgotten, hoping to uncover hobbies, restaurant preferences, or other interests that might lead to a pattern in password creation.

Gathering Non-Public Information—In addition to publicly available data, attackers seek more sensitive, non-public information, notably from financial transactions. They can obtain banking and credit card data—revealing purchases, subscriptions, or favorite merchants—through financial institution breaches, insider threats, or by purchasing stolen records on the dark web. This information helps map out spending patterns (e.g., concert tickets, gym memberships) that might hint at anniversaries, significant dates, or passions a user could incorporate into their passwords. Some malicious actors also turn to commercial aggregators that combine both public and private data (including credit reports and loan details) into detailed personal dossiers. Utility records and real estate documents can further reveal a user's location, property ownership, or large purchases, providing additional fodder for password guessing—such as nicknames for boats or cars. Lastly, if attackers compromise private communications—emails, device backups, text messages, or cloud storage—they might discover intimate details, including children's names, vacation plans, or even explicit password hints stored in files, notes, or diaries.

Next, the malicious actor builds a profile based on the information (step 104). Attackers begin by creating an "information graph" that connects scattered data points—such as a user's favorite sports teams, concert purchases, and personal nicknames—into potential password elements (e.g., "Steelers #1," "PearlJam1994"). This process also links seemingly random details like a pet's name found on social media with a date discovered in a financial transaction record (for instance, the day that pet was adopted). Next, they assign scores or rankings to each data point based on how likely it is to appear in a password: a frequently mentioned artist such as Taylor Swift or a repeated nickname may be ranked higher, while non-public facts (like a hidden anniversary) might hold special value because users often think such "secret" dates are safe to use. Once attackers have compiled and prioritized these personal tidbits, they combine them into a curated dictionary, adding symbols, numbers, or uppercase letters to generate a wide range of targeted guesses. By blending public information—gleaned from social media, data brokers, and leaked databases—with non-public details such as financial records or private communications, malicious actors create a thorough user profile. Armed with this wealth of knowledge, they can craft highly accurate password guesses or answers to security questions, significantly increasing their likelihood of breaching user accounts.

With the information, the malicious actor generates password guesses (step 106). To begin, attackers compile a custom dictionary from the user's knowledge map, focusing on potential password components. For example, if a user loves the band "Imagine Dragons," the attacker might generate variations such as "ImagineDragons," "ImagineDr@gOns," or "ImagineDragon$2012," incorporating album release years or other meaningful dates. Next, they systematically apply common character substitutions—like turning "O" into "0" or "S" into "$"—to expand their list of possible matches. They also combine multiple data points, such as the names or nicknames of children and pets, birth years, anniversaries, graduation dates, and favorite sports or musical references. This allows them to create hybrid passwords like "JohnBrady12*!,*" *"Bella*@Tswift1990," or "VanGoghStarryNight$95." Finally, modern password-cracking scripts and AI-driven tools can automatically test thousands—or even millions—of these guesses, significantly increasing the attacker's odds of finding the correct password.

Next, the malicious actor tests the guessed passwords (step 108). Once attackers have compiled a list of potential passwords—often gleaned from personal data—they can try these guesses in two primary ways. First, they may attempt online brute force by submitting password guesses directly to the login page of a targeted service. If the site has weak or poorly enforced lockout policies, the attacker can try many combinations sequentially, sometimes distributing attempts across multiple IP addresses (botnets) to avoid triggering alerts or rate limits. Second, if the attacker obtains a database of stolen password hashes (for instance, from a prior data breach), they can conduct offline cracking. In this scenario, there is no limit to the number of attempts, so the attacker simply runs each generated password variation through specialized cracking tools until they find a match. These approaches become even more effective when attackers rely on credential stuffing—reusing cracked passwords on multiple sites (e.g., email, banking, social media) in hopes that the user recycles the same or similar credentials. If direct guessing fails, attackers may employ social engineering tactics, such as exploiting password recovery or "secret question" prompts. By leveraging personal details (like favorite bands or pets' names) or orchestrating phishing schemes, they can trick unsuspecting users into divulging their login information.

Even where basic safeguards exist, attackers devise workarounds. Weak or absent lockout policies allow near-unlimited attempts, which a patient attacker can spread out to avoid detection. Two—factor authentication (2FA) is a valuable layer of defense, but can be circumvented through subscribe identity module (SIM) swapping—co-opting a victim's phone number to intercept texted codes—or by phishing the user into entering their 2FA code on a fake login page, which then relays the code in real time to the legitimate site. Another trick is "push notification fatigue," where repeated prompts eventually coerce a user into approving a login out of annoyance. Social engineering in general can undermine otherwise sound security measures: attackers may impersonate the user with customer support, or pose as a trusted party over the phone (vishing) or via email (spear phishing), manipulating the victim into surrendering codes or clicking malicious links. If account resets rely on easily guessable security questions, or if email-based 2FA can be compromised, the door to account takeover remains open.

Attackers also exploit credential stuffing and replay attacks. They systematically test username-password pairs lifted from one breach across other platforms, capitalizing on reused credentials. If they intercept session tokens or cookies via malware or unsecured connections, they might bypass 2FA entirely because the session is already authenticated. Password reset processes can be subverted with known or guessed answers to security questions, and gaining control of a user's email often grants easy access to all linked accounts. Malware and keyloggers installed on a victim's device may capture every keystroke, including passwords and one-time codes, while Remote Access Trojans (RATs) give attackers deeper system control. Finally, insider threats—like rogue employees—or physical theft of a logged-in device can bypass protective measures if security protocols are weak or inconsistently enforced.

Much of the success hinges on the predictability of human behavior and the wealth of personal information readily available online. By focusing on a user's known likes, relationships, and significant dates, attackers avoid brute forcing every possible character combination. Modern AI tools rapidly gather and analyze details from social media, data brokers, and leaks, generating narrow, high-accuracy guess lists. Many users also reuse or slightly modify the same passwords across multiple accounts, making credential stuffing incredibly effective once a single site is compromised.

Finally, the malicious actor gains system access (step 110). Once an attacker successfully guesses a user's password, they gain full access to that account. If the account holds administrative privileges or is tied to a larger network (as in a corporate environment), the attacker can move laterally to other systems, searching for valuable information such as financial records or intellectual property. This process, known as privilege escalation, often involves uncovering stored credentials or leveraging additional system vulnerabilities that grant deeper access. Because many users reuse or slightly modify the same password across platforms (e.g., email, banking, or social media), a single compromise can quickly lead to a broader breach if the attacker tests those credentials on multiple sites.

Much of the attacker's success relies on the predictability of human behavior: many individuals choose passwords based on family names, favorite bands, or significant dates, rendering them guessable once an attacker gathers enough personal data. Password recycling further heightens the risk; changing "Password1" to "Password2" or using the same login for multiple services becomes an open invitation for credential stuffing attacks. Moreover, modern AI and automation allow malicious actors to rapidly scrape personal details, generate highly targeted guesses, and methodically test them—dramatically increasing their odds of success.

Ultimately, malicious actors can leverage personal information to create focused password dictionaries and employ systematic testing to breach accounts. Even passwords that appear complex can be relatively easy to guess if they incorporate personal references or fail to follow best practices. By exploiting weak lockout policies, reusing compromised credentials on multiple sites, or circumventing multi-factor authentication, attackers significantly improve their chances of gaining unauthorized access. Mitigating these risks requires using genuinely random, unique passwords, enabling robust multi-factor authentication, implementing strict lockout policies, and training users to be vigilant against social engineering tactics.

Determining Password Strength with Context

To mitigate these risks, the present disclosure focuses on genuinely random, unique passwords and training users. The central idea is that password strength cannot be determined solely by looking at traditional complexity metrics (e.g., length, special characters, uppercase letters). While a random-looking password might seem secure by conventional standards, it can become surprisingly easy to crack if it's based on personal information that is available—especially as AI accelerates data gathering and pattern recognition. By scraping social media posts, pictures, financial transactions, and other digital footprints, attackers can narrow down the likely combinations someone might use for passwords or security questions.

Figure 2:
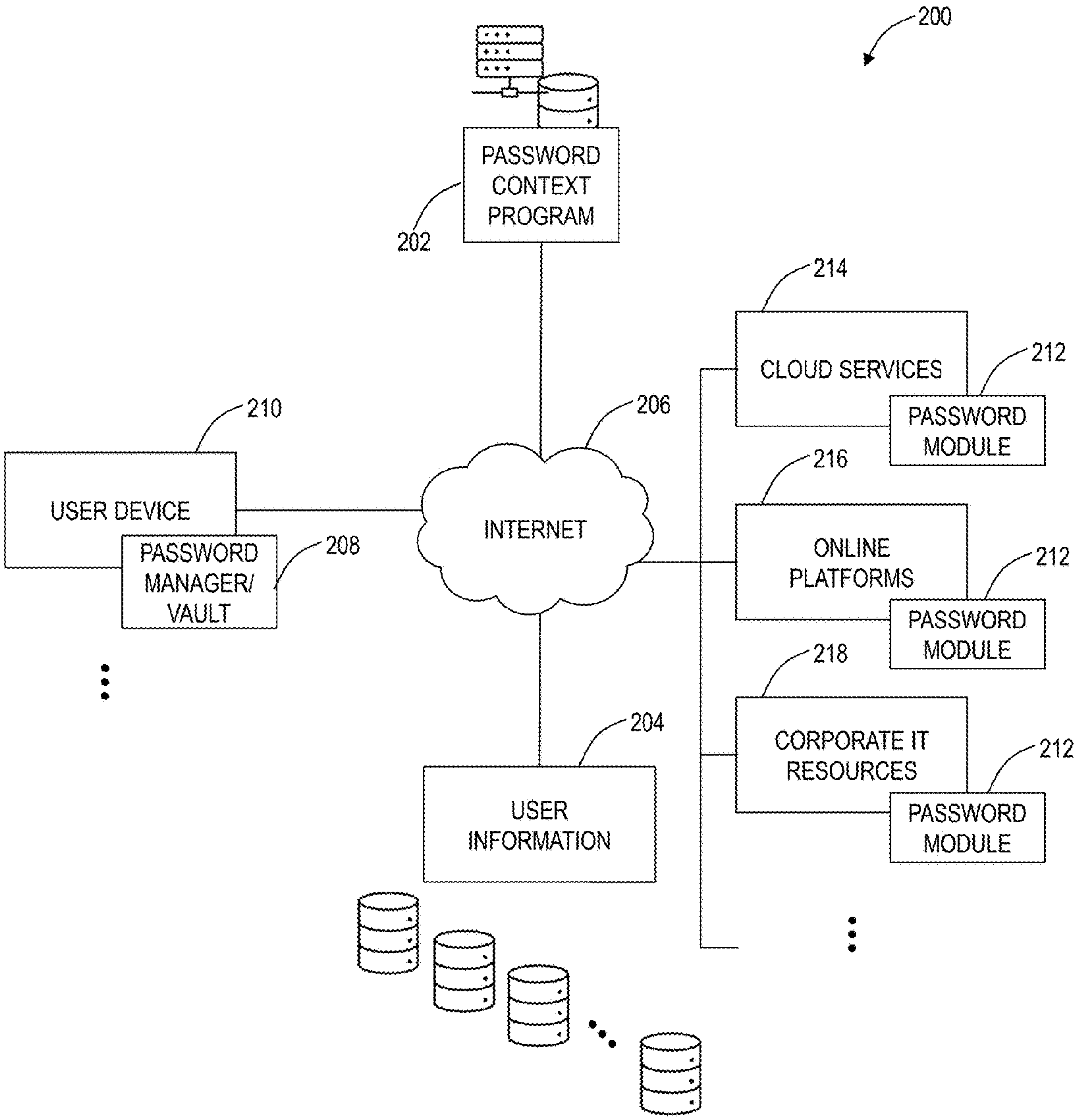
FIG. 2 illustrates a system in which a password context program employs both public and non-public user information to provide a context-aware evaluation of password strength.

FIG. 2 illustrates a system 200 in which a password context program 202 employs both public and non-public user information 204 to provide a context-aware evaluation of password strength. The password context program 202 leverages the Internet 206 to gather this diverse data—ranging from social media profiles to corporate databases—and uses it to identify personal references or patterns an attacker could exploit. By correlating these findings with password input and storage mechanisms, the system 200 can give users more realistic feedback on how secure their credentials truly are.

In this setup, the password context program 202 can integrate with a password manager/vault 208 on a user device 210, such as a smartphone, laptop, desktop, tablet, or server. This password manager/vault 208 may be:

(1) a browser-based password storage solution (e.g., Chrome, Firefox, or Safari's built-in password repository), (2) A dedicated third-party application (e.g., 1 Password, LastPass, or Dashlane), (3) A corporate single sign-on (SSO) platform like Okta, which stores or synchronizes login credentials for enterprise services, or (4) An operating system-level password storage feature (e.g., Apple's Keychain on macOS/iOS, the Credential Manager on Windows, or GNOME Keyring in Linux).

These password manager/vaults 208 typically store all of a user's saved credentials, sometimes syncing them to the cloud or across multiple devices. By interfacing with the password manager/vault 208, the password context program 202 can retroactively analyze existing passwords and flag any that rely too heavily on publicly discoverable personal data (e.g., a favorite sports team or a widely shared pet name).

The system 200 also contemplates a password module 212 present in various online or networked environments. Such modules appear in:

(1) Cloud services 214 (e.g., file-sharing platforms, email hosting solutions, or virtual machine infrastructures), (2) Online portals and "Software as a Service" (SaaS) applications, online platforms 216 (e.g., social media sites, e-commerce platforms, project management tools), or (3) Corporate IT resources 218 (e.g., internal databases, intranets, on-premise servers, or enterprise software suites).

A password module 212 is essentially the component or interface within these environments where users create, update, and input their passwords—such as an account settings page, an "update password" form, or an admin console requiring credential changes. The password context program 202 can hook into these modules at the point of password entry or update, analyzing the proposed credentials and checking them against the user information 204 it has collected. If the chosen password includes references that are easily gleaned from public data (e.g., a common pop-culture reference the user frequently posts about), the system 200 immediately alerts the user, recommends safer alternatives, or scores the password to show its context-based vulnerability. Accordingly, the system 200 both serves to require a user to provide a stronger password as well as educate users of the risks.

By linking together the password manager/vault 208 and the distributed password modules 212 across different services, the password context program 202 ensures comprehensive coverage. Users benefit from real-time password guidance during new account creation or password updates, as well as retroactive analysis of passwords already in use. This holistic approach minimizes the risk of personal-information-based attacks across the user's entire digital ecosystem.

Those skilled in the art will recognize that FIG. 2 and the accompanying description of system 200 serve merely as an illustrative example. In practice, the password context program 202 can extend to virtually any situation where a user must provide credentials or otherwise prove their identity, whether in the digital or physical realm. For instance, the system's context-aware approach could be applied to PIN codes used for accessing bank accounts or ATM services, ensuring that the numerical sequence is not easily derivable from personal data (e.g., birthdates or addresses). It might also be used to secure physical access codes (such as those for buildings, office suites, or gated communities), warning users if their chosen sequence appears too closely related to their public information. Similarly, security questions— commonly used for password resets—may rely on publicly accessible details (e.g., mother's maiden name, favorite pet, or elementary school), rendering them easily guessable. By integrating the password context program 202, these security questions can be automatically flagged and improved, prompting users to select less predictable alternatives. In essence, this system can be deployed in any scenario where a user is required to provide a unique, confidential piece of information—ranging from personal identification numbers to security hints—offering robust protection against targeted attacks based on publicly available user data.

Context-Aware Password Strength Scoring

Figure 3:
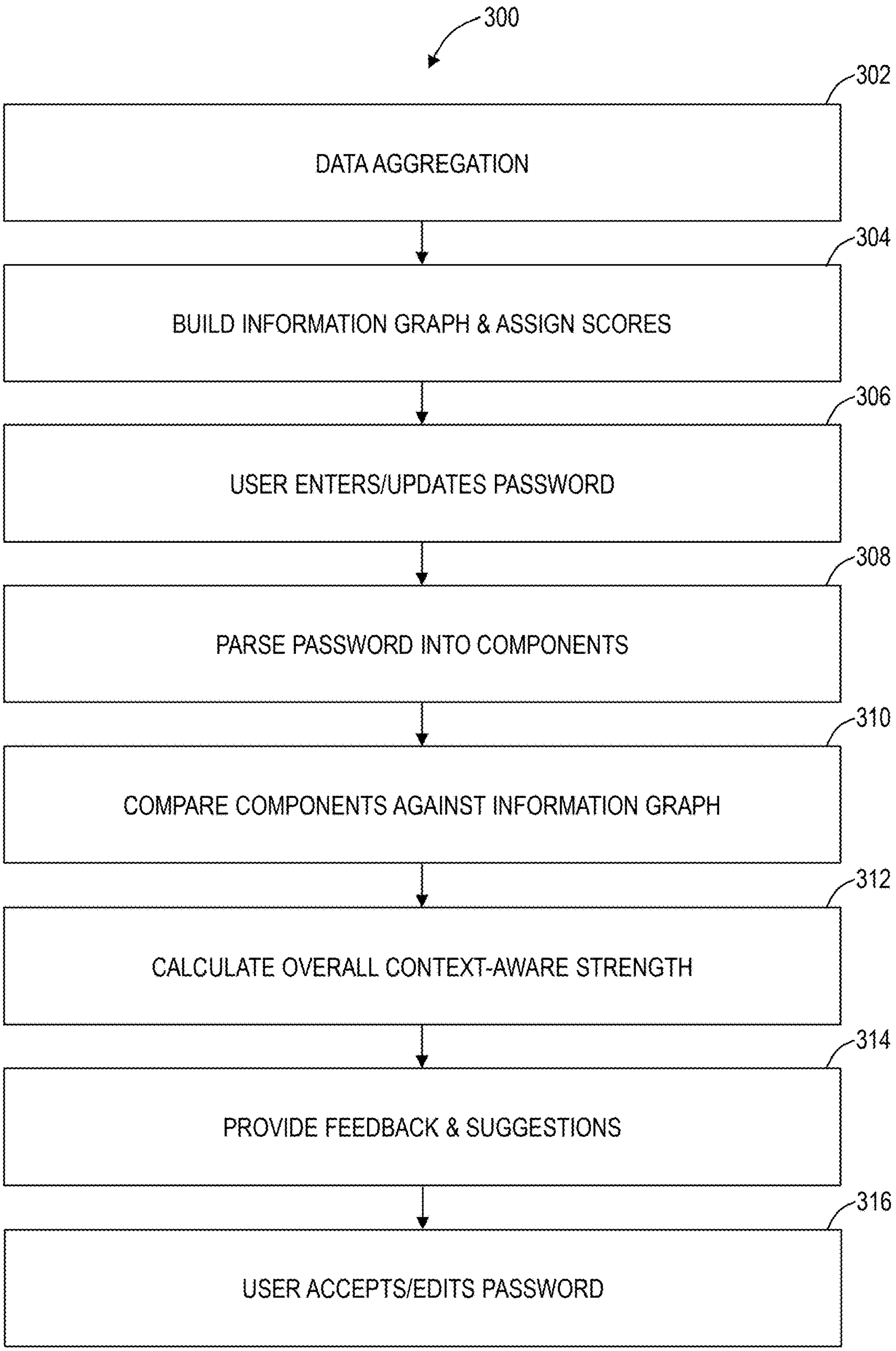
FIG. 3 illustrates a context-aware password strength scoring process.

FIG. 3 illustrates a context-aware password strength scoring process 300. In various embodiments, the process 300 can be implemented in various ways, including: as a method including steps, via one or more computing systems having one or more processors configured to execute the steps, and through a non-transitory computer-readable medium that stores instructions which, when executed, cause one or more processors to perform the steps. This flexibility ensures the process 300 can be adapted to different system architectures and deployment scenarios. In an embodiment, the process 300 can be implemented in the system 200 via the password context program 202, as a cloud service and/or via integration with the user devices 210, password managers/vaults 208, and password modules 212 across cloud services 214, online platforms 216, corporate IT resources 218, and the like. Other embodiments and implementations are contemplated.

The process 300 includes data aggregation (step 302) by aggregating user-specific data from multiple sources, including social media accounts, data brokers, leaked databases on the dark web, financial transactions, and private repositories such as device backups or emails. During the data aggregation step, the password context program 202 gathers both public and private data to form a comprehensive picture of the user's digital footprint. Those skilled in the art will recognize the data aggregation can be vast covering both public information and non-public information, and include various examples:

(1) Search social media, e.g., Searching Twitter (X), Facebook, and Instagram for mentions of a favorite sports team or musician.

(2) Checking data broker sites for addresses, phone numbers, or employment details.

(3) Scanning dark web marketplaces to see if the user's name or email appears alongside compromised credentials.

From, a technical implementation, the data aggregation can include AI-Powered Web Scraping: Automated scripts and machine learning (ML) models can detect personally identifiable information (PII) and relevant keywords (e.g., pet names, birthdays). The data aggregation can further include Entity Extraction: Natural Language Processing (NLP) techniques can parse text from social media posts, emails, or chat logs, labeling key entities (names, dates, places) to form a structured data set. All aggregated information is stored in a secured database or encrypted data lake to maintain privacy and compliance.

Notably, the password context program 202 can operate locally on the user device 210 (e.g., a smartphone, laptop, or desktop), thereby using personal data stored on or accessible to that device 210 while reducing the risk of exposing sensitive information to third-party systems. The password context program 202, when installed and run on the user device 210, can gain direct access to locally stored information—such as emails, messaging app data, photo metadata, and other user files—to identify personal references that might appear in a password. By performing these analyses locally, the system 200 avoids transmitting raw personal data to external servers, thereby mitigating potential leaks or interceptions.

Sensitive files and directories remain under the user's control; only relevant references (e.g., names, dates) are extracted, processed, and stored in an encrypted local database or memory structure managed by the program 202. Any personal information retrieved from the user device 210 (e.g., from backups, notes, or offline archives) is accessed using secure local application programming interfaces (APIs) or file-system permissions that require user authorization. Before storing or using any extracted data, the password context program 202 may encrypt it with the device's native cryptographic functions (e.g., hardware-based encryption on iOS/Android or full-disk encryption on modern operating systems). This ensures that even if the device is compromised, the collected data remains protected.

The program 202 can also interface with a locally running password manager/vault 208 (for example, Keychain on macOS/iOS or an encrypted vault application) to retrieve user credentials or metadata related to password usage. Communication between the program 202 and the password manager/vault 208 uses secure inter-process channels, further safeguarding the transfer of sensitive information.

In an embodiment, rather than continuously gathering or storing all of the user's personal data, the password context program 202 selectively extracts only those elements needed to build an "information graph." For instance, it may parse emails to identify common nicknames or references to favorite hobbies without retaining full message content. This selective approach aligns with privacy-by-design principles, limiting the scope of data collection and ensuring minimal exposure of sensitive details.

In parallel with or separate from local aggregation, the system 200 gathers public information (e.g., social media posts or data broker findings) over secure channels. If the user consents, the program cross-references these public details (e.g., widely posted events, known hobbies) with the private data from the device 210. The combined information forms a holistic user profile that uncovers both publicly visible and more intimate references. Because the password context program 202 can run on the user device 210, users can configure how extensive the data aggregation should be. They can limit or expand the directories, email accounts, or other resources the program can access.

By conducting the bulk of its data aggregation locally and encrypting any stored records, the password context program 202 respects user privacy while still building a robust, context-rich profile that accurately reflects the user's personal information. This secure local operation ensures that the data necessary for context-aware password analysis is gathered in a way that prioritizes confidentiality—only sending anonymized or non-sensitive references to external services, if at all, and keeping private details under the user's direct control.

The process 300 includes building an information graph and assign scores (step 304). Once the password context program 202 completes its data collection, it can construct a graph structure that links each piece of personal data—such as favorite bands, family nicknames, or significant dates—to the user's profile. Each item becomes a node in the graph, while edges define the relationships between these items and the user (e.g., "favorite musician," "mentioned on social media," "referenced in private email"). A difficulty score is then assigned to each node, reflecting how easily an attacker could uncover that data (for instance, a frequently mentioned basketball team might score 1, whereas a little-known childhood nickname might score 4 or 5).

The graph can be stored in an embedded database (e.g., a local instance of Neo4j, a lightweight graph library, or a file-based approach) residing on the user device 210, as well as in a cloud service hosting the program 202 or the password modules 212. All nodes and edges are written to a secured, encrypted data store—leveraging native operating system security features (e.g., file encryption on Windows, Keychain on macOS/iOS, or disk encryption on Android).

Nodes represent distinct data points (e.g., "RedSox," "2023," "TaylorSwift," "ChildhoodNickname"). Each node contains attributes such as the source (public post, private email, dark web leak), frequency of mention, and confidence (e.g., is it a certain user interest or a possible guess?). Edges indicate connections between nodes and the user. For example, an edge could read "(User)-[LIKES]→(BandNode)" or "(User)-[MENTIONED_IN_EMAIL]→(NicknameNode)." Additional edges might show relationships between nodes themselves, like "(BandNode)-[ASSOCIATED_WITH]→(SongLyricNode)." A difficulty score can be stored as a node attribute that quantifies how hard it would be for an attacker to obtain this information. In an embodiment, the system's 200 scoring algorithm factors in source reliability (e.g., public social media vs. private text messages), frequency of mention (how often a node appears in aggregated data), exposure type (public post vs. direct message vs. dark web listing), and the like.

The technical implementation of the graph can include Neo4j, Amazon Neptune (if running on an environment that supports containers), or a simpler, file-backed graph library (like a lightweight library in Python or Java) can power the graph structure. Graph databases typically do not require a rigid schema, making it easy to add new nodes/edges as more user data is discovered. The graph database or files can be encrypted at rest, and read/write access controlled by the password context program 202, ensuring only authorized processes can view or modify the user's information.

The process 300 includes a user entering or updating a password (step 306). Once the password context program 202 recognizes that a user has created or modified a password—whether through a password manager/vault 208 on the user device 210 or via a password module 212 in a SaaS platform or corporate IT environment—it proceeds to parse the password into identifiable segments (step 308). This segmentation can leverage anything from basic regex-based splitting to more advanced natural language processing (NLP) techniques, allowing the system to detect words, abbreviations, numeric sequences, common character substitutions (e.g., "a"→"@"), or l33t speak (e.g., "Y@nk3eFan87" broken down into "Y," "@nk3," "eFan," and "87"). In another example, "RedSoxChampion2024!" might be split into "Red," "Sox," "Champion," "2024," and "!". The program also supports fuzzy matching (e.g., Levenshtein distance) to spot near-matches, such as "P@tri0ts" corresponding to "Patriots."

After parsing, each segment is checked against the local graph structure (step 310)—a privacy-focused database residing on the user device 210. This graph contains nodes tied to the user's personal data (e.g., favorite teams, commonly mentioned phrases, obscure code names), each assigned a difficulty score that reflects how public or private that information is. For instance, if "RedSox" is heavily referenced in the user's social media posts, the graph may return a difficulty score of 1, indicating it is widely accessible to potential attackers. Conversely, a little-known nickname discovered only in an encrypted device backup might carry a difficulty score of 4 or 5, signifying higher obscurity. The password context program 202 retrieves these node scores through an efficient query engine, possibly applying confidence thresholds to handle exact or partial matches. It then aggregates the individual component scores—commonly via multiplication or weighted sums—to derive an overall context-aware strength rating. Real-time insights are delivered to the user based on this rating, made possible by the graph's local residence on the user device 210. As the user's data evolves—through new social media posts, updated backups, or emerging dark web leaks—nodes and edges in the graph are dynamically updated, ensuring each difficulty score accurately reflects the latest exposure level.

The process 300 includes calculating an overall context-aware strength (step 312). After each password segment has been matched to a difficulty score, the password context program 202 combines these values to produce a composite metric that accounts for both conventional password complexity—such as length, use of special characters, and uppercase letters—and context-derived vulnerabilities linked to personal information. For example, a password containing four segments scored at 1, 0, 2, and 3 could yield a final score of 0 (if the system multiplies segment scores) or a similarly low composite rating—effectively failing the context check. By simply substituting the zero-scoring segment (representing highly public data) with a more obscure reference, the user can significantly boost the final rating.

The system may use either weighted multiplication or addition to aggregate these scores. In more advanced implementations, machine learning (ML) models could dynamically adjust each segment's weighting based on context, factoring in total password length or the presence of special characters. Organizations can also define dynamic thresholds that require the context-aware strength score to reach a minimum threshold-akin to existing rules that mandate a certain number of uppercase letters or symbols.

For example, if "RedSox" is a frequently referenced term on the user's public social media accounts the system assigns it a low difficulty score (e.g., 1). Conversely, a seldom-used personal code name discovered only in private messaging conversations might carry a score of 3 or 4, indicating higher resistance to targeted attacks. As the password context program 202 aggregates these segment scores, users relying on obscure references can significantly enhance the overall security of their passwords compared to those using well-known interests or easy-to-find personal data.

By storing the graph locally and updating its nodes (and their difficulty scores) as new social media posts or backups emerge, the system ensures its analysis remains current. This graph-based, parsing-driven approach—coupled with real-time scoring and fuzzy matching—provides a robust alternative to traditional brute-force or permutation-based checks, offering a richer defense against adversaries who systematically gather user-specific information. Ultimately, this methodology empowers users to maintain control over sensitive data and receive immediate, context-aware guidance whenever they create or update a password.

The process 300 includes providing feedback and suggestions (step 314). Whenever the context-aware analysis identifies potentially weak or overly guessable elements within a password, the password context program 202 alerts the user. This feedback may manifest as a pop-up message, notification, or inline warning, making it clear which specific segments of the password raise security concerns. For instance, if the user has repeatedly posted about Taylor Swift concerts on Instagram, the program might display a prompt such as: "Using 'TaylorSwift' is risky because your public profiles indicate multiple concert attendances." In such cases, the system can recommend substituting that segment with a less-exposed reference or even propose a fully random alternative if personal data is overly public.

To generate suggestions, NLP routines or machine learning text-generation models examine the user's existing data graph to avoid references that appear frequently in social media posts, blog comments, or data-broker records. These routines might suggest synonyms, personal but relatively underexposed references, or entirely randomly generated strings—for example, converting "YankeesFan23" into "SpaceNostalgia59" if the latter does not appear in any discovered user data. By offering these tailored recommendations, the system helps the user understand the connection between their password components and their public digital footprint, encouraging more secure choices. Over time, new or refined suggestions can be offered as the user's information graph updates in response to changes in social media activity, device backups, or dark web monitoring. This dynamic, context-driven approach educates the user on how seemingly harmless personal interests can reduce password strength and provides practical, real-time strategies to mitigate those risks.

Finally, the user decides whether to revise their password or proceed with the flagged references (step 316). This step updates the password manager 208, the relevant password module 212, or both. A user may accept a recommended password for added security. In an enterprise environment, an IT policy might force a user to pick an acceptable score level before finalizing their choice. Approved passwords can sync across devices via the manager/vault 208 or push to SaaS services 214 through secure APIs. The system logs the event and final score, potentially updating the user's information graph if new personal references are introduced.

In addition to analyzing passwords at the point of creation or update, the password context program 202 can employ AI-driven monitoring to detect newly emerging weak points. Machine learning models periodically re-check user data (e.g., new social media posts, updated breach reports) to see if certain once-obscure references become more public. If the system detects that a previously secure password component (like a rarely mentioned pet name) is now widely visible, it can proactively alert the user or an admin to update credentials. Enterprises can receive regular reports on the context-aware health of user passwords across corporate resources 218, helping security teams mitigate risk promptly.

The process 300 provides a holistic, context-aware means of securing credentials. Traditional strength metrics alone often give a false sense of safety if personal references are easily discoverable online. However, this solution addresses the growing challenges posed by AI-driven data collection by correlating password components with user-specific public and private data. Through real-time analysis, proactive warnings, and continuous monitoring, the password context program 202 enables users and organizations to adopt genuinely robust, personalized security measures that adapt as personal information evolves.

The following is a high-level overview of how the process 300 can map to various components within system 200—namely, the password context program 202, the user device 210, the password manager/vault 208, and the password modules 212. The process 300 begins with the step 302, in which the password context program 202 collects user-specific data from multiple sources over the Internet 206—including social media, data brokers, dark web repositories, and private device backups or emails. During this phase, the user device 210 may grant access to local archives, while the password manager/vault 208 can optionally supply metadata such as last-updated timestamps. In the step 304, the password context program 202 structures this data into an information graph, assigning each node (e.g., a favorite sports team) a "difficulty score" to reflect how easy or hard it is for an attacker to discover. The user device 210 and password manager/vault 208 primarily act as data sources here, while password modules 212 may provide usage logs but do not participate in building the graph.

When the user decides to create or modify a password (step 306), they do so through the user device 210 or within password modules 212—for instance, a SaaS platform or a corporate IT system. The password context program 202 then intercepts or receives the new password (via an API hook, browser extension, or built-in feature) and triggers the subsequent parsing and comparison. In the step 308, the password context program 202 breaks the password (e.g., "JohnCena@2023!") into segments (e.g., "John," "Cena," "@," "2023," "!"), which are checked against the information graph in the step 310. At this stage, the system matches each segment to its corresponding difficulty score, determining if the reference is highly public, partially hidden, or obscure. The user device 210, password manager/vault 208, and password modules 212 merely await the program's verdict on these scores.

Next, in the step 312, the password context program 202 aggregates the segment-level scores—often via multiplication or a weighted formula—to yield a final rating. If the composite score is too low, the step 314 kicks in, where the user is notified in real time. The program can recommend less obvious or entirely random references to bolster password strength. Here, cloud services 214, online platforms 216, and corporate IT resources 218 may embed this feedback into their workflows, ensuring users receive consistent guidance across different environments. Finally, the step 316—through their device 210, password manager/vault 208, or password module 212—to revise or confirm the updated password, fully aware of any risks. If they submit a revised password, the system re-runs steps 308-312 to confirm the improvements.

Overall, the password context program 202 orchestrates the steps 302, 304, executes the steps 308-312 (parsing, comparison, and final scoring), and generates real-time user feedback in the step 314. The user device 210 is the primary interface for entering and accepting passwords and may supply private data during the step 302. The password manager/vault 208 stores credentials, helps facilitate password changes, and displays system feedback to guide the user toward stronger passwords. Meanwhile, the password modules 212 (linked to cloud services 214, online platforms 216, or corporate IT resources 218) provide the operational environment for password input and validation. Through these coordinated roles, system 200 delivers a comprehensive, context-aware method for securing user credentials—one that accounts for personal data vulnerabilities and ensures truly robust password practices.

Example Computing System Architecture and Cloud Deployment

Figure 4:
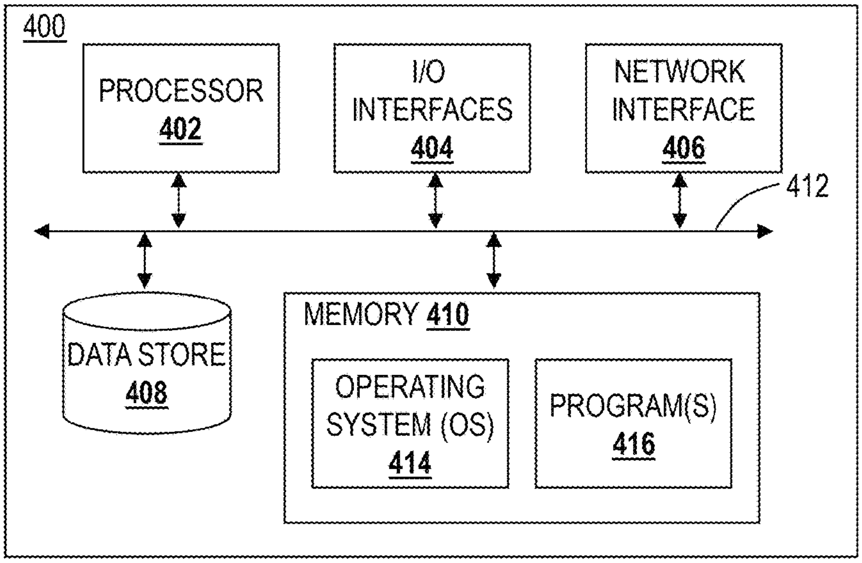
FIG. 4 illustrates a block diagram of a computing system, which may be used to implement various components in the computing system.

FIG. 4 illustrates a block diagram of a computing system 400, which may be used to implement various components in the computing system 200. The computing system 400 can be implemented in many ways, including laptops, desktops, smartphones, tablets, physical servers, clusters of machines, virtual machines (VMs) running on hypervisors, or serverless computing frameworks. Regardless of the underlying infrastructure, the computing system 400 typically includes one or more processors 402, input/output (I/O) interfaces 404, a network interface 406, a data store 408, and memory 410.

It should be noted that FIG. 4 presents a simplified view; in practice, the computing system 400 may feature additional hardware and software. These components 402, 404, 406, 408, 410 are coupled via a local interface 412, which may include various wired or wireless buses, high-speed interconnects, or switching fabrics. The local interface 412 can also include controllers, buffers, caches, drivers, repeaters, and receivers, along with addressing and control lines to promote efficient communication and resource sharing among components.

Each processor 402 is a hardware element—such as a CPU, multicore processor, system-on-chip (SoC), GPU, or a processing element in a larger compute cluster—designed to execute software instructions. These processors may be general-purpose or specialized, selected based on performance, power efficiency, or workload needs. During operation, each processor 402 retrieves and executes instructions stored in memory 410, coordinates data exchanges with the data store 408, and manages overall system activities. In large-scale environments, multiple processors 402 can be used in parallel computing architectures to handle elevated traffic and complex workloads efficiently.

The I/O interfaces 404 allow the computing system 400 to interact with external peripherals, enabling both user input (e.g., via keyboards, touchscreens, or sensors) and system output (e.g., to displays or printers). Depending on the application, these I/O interfaces 404 can also support specialized devices for maintenance, debugging, or other administrative functions. Meanwhile, the network interface 406 handles connectivity to external networks, which may include the Internet, private corporate networks, or cloud environments. This network interface can be based on Ethernet, Wireless LAN, 5G, or a virtualized cloud interface. By relying on secure transport protocols and encryption, data transmitted via the network interface 406 can remain protected, enabling the computing system 400 to participate in distributed or cloud-based deployments.

The data store 408 provides storage for both persistent and temporary data. This storage may utilize volatile memory (e.g., RAM) for transient, high-speed operations or nonvolatile media (e.g., solid-state drives, hard disk drives, optical media) for durable, long-term retention. In some deployments, the data store 408 may be integrated with network-attached storage (NAS), storage area networks (SAN), or cloud-based storage solutions. These configurations can scale from modest local setups to enterprise-level installations, potentially offering features such as global deduplication, compression, encryption at rest, and multi-site replication. The data store 408 may hold operational logs, configuration details, policy rules, program binaries, and cached computation results.

The memory 410 is the primary working memory for the processors 402, often composed of volatile elements like DRAM (e.g., DDR, SDRAM) for speed, though it may also include nonvolatile components such as Flash memory or NVRAM. Memory 410 can be distributed across nodes or servers, supporting large-scale in-memory processing demanded by modern cloud services. Typically, the memory 410 stores the operating system (O/S) 414 and one or more programs 416. The O/S 414 handles core system tasks such as process scheduling, memory allocation, file management, and networking.

For SaaS or cloud components in the system 200, the computing system 400 can be deployed as a private cloud in a single organization's datacenter, a public cloud hosted by a third-party provider, or a hybrid cloud combining elements of both for specific security, performance, or compliance considerations. Cloud computing abstracts physical hardware—servers, storage devices, network components—into on-demand, scalable resources. This enables organizations to provision computing power, storage, and network bandwidth with minimal upfront expenses, adapting to fluctuating workload demands.

According to the U.S. National Institute of Standards and Technology (NIST), cloud computing is "a model for enabling convenient, on-demand network access to a shared pool of configurable computing resources (e.g., networks, servers, storage, applications, and services) that can be rapidly provisioned and released with minimal management effort or service provider interaction." Unlike traditional client-server environments, cloud computing typically delivers applications via a web interface, reducing the need for local installations and updates. Centralizing the hosting of applications allows providers to uniformly release new features, apply security patches, and manage licensing. These cloud-based models, often referred to as "Software as a Service" (SaaS), allow end users to access the software through browsers or lightweight client applications, benefiting from continuous improvements and frequent updates.

Various embodiments may rely on different forms of processing circuitry-general-purpose microprocessors, CPUs, DSPs, network processors, GPUs, FPGAs, PLDs, or similar. This circuitry may be controlled by software, firmware, or a combination thereof, possibly in combination with non-processor circuits, to accomplish the functionalities outlined here. Alternatively, specific tasks may be implemented by state machines or one or more ASICs (application-specific integrated circuits), each addressing certain functions through dedicated logic. In some cases, a hybrid approach that merges these strategies may be adopted. Moreover, implementations can include a non-transitory computer-readable storage medium that holds computer-readable instructions. When executed by a device containing suitable processing circuitry, these instructions drive the system to perform the disclosed methods or algorithms. Examples of non-transitory storage media include hard disks, optical disks, magnetic devices, ROM, PROM, EPROM, EEPROM, flash memory, or other forms of persistent/semi-persistent storage. Once stored, the executable instructions enable the system to fulfill the methods detailed in this disclosure.

Process for Providing Context-Aware Password Strength Evaluation

Figure 5:
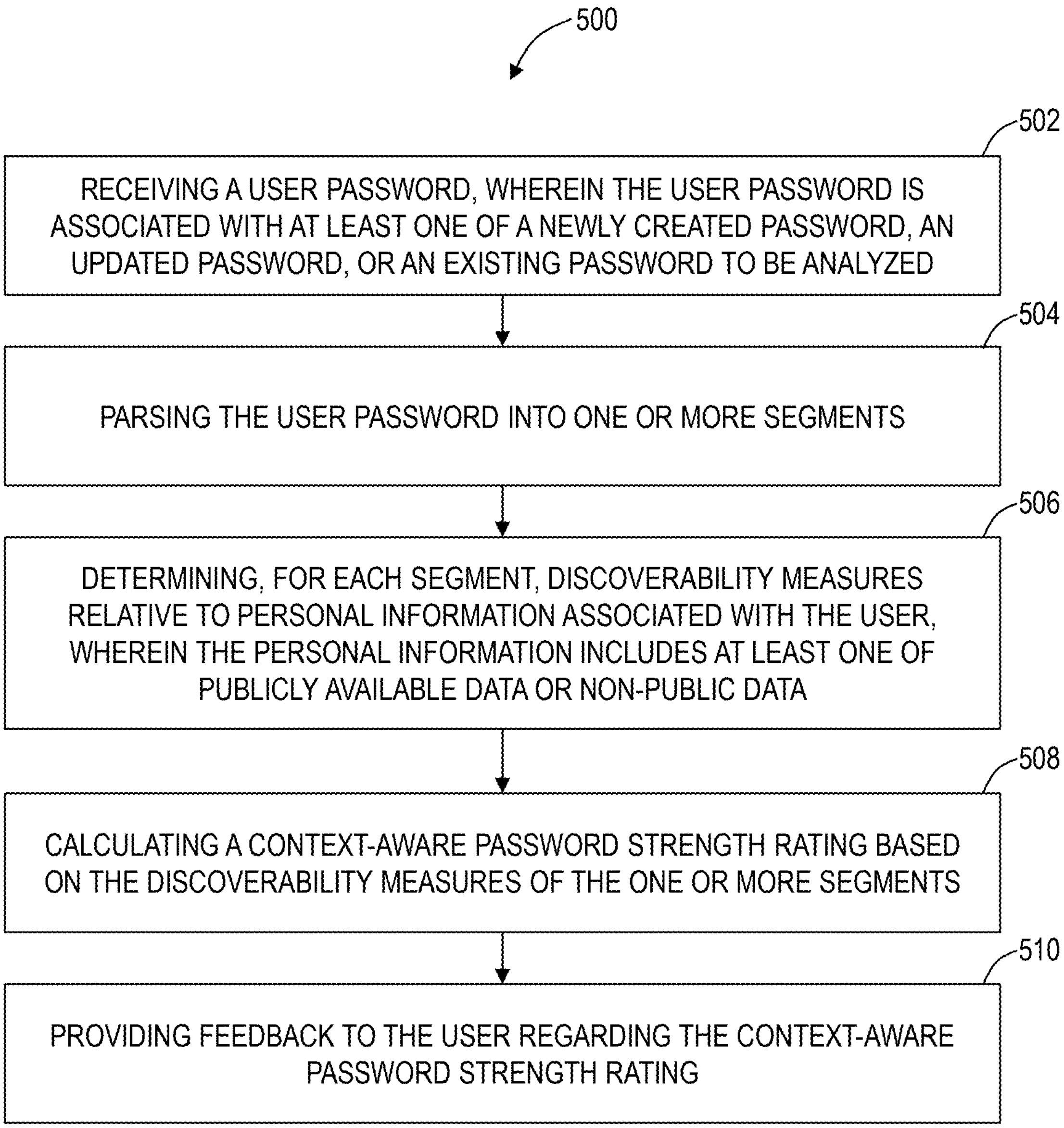
FIG. 5 illustrates a flowchart of a process for providing context-aware password strength evaluation.

FIG. 5 illustrates a flowchart of a process 500 for providing context-aware password strength evaluation. In various embodiments, the process 500 can be implemented in various ways, including: as a method including steps, via one or more computing systems having one or more processors configured to execute the steps, and through a non-transitory computer-readable medium that stores instructions which, when executed, cause one or more processors to perform the steps. This flexibility ensures the process 500 can be adapted to different system architectures and deployment scenarios. In an embodiment, the process 500 can be implemented in the system 200 via the password context program 202, as a cloud service and/or via integration with the user devices 210, password managers/vaults 208, and password modules 212 across cloud services 214, online platforms 216, corporate IT resources 218, and the like. Other embodiments and implementations are contemplated.

The steps receiving a user password, wherein the user password is associated with at least one of a newly created password, an updated password, or an existing password to be analyzed (step 502); parsing the user password into one or more segments (step 504); determining, for each segment, discoverability measures relative to personal information associated with the user, wherein the personal information includes at least one of publicly available data or non-public data (step 506); calculating a context-aware password strength rating based on the discoverability measures of the one or more segments (step 508); and providing feedback to the user regarding the context-aware password strength rating (step 510).

The calculating the context-aware password strength rating can include aggregating the discoverability measures through a scoring model that accounts for accounts password length, character diversity, and assigned difficulty scores based on the personal information. The providing feedback can include alerting the user if any segment corresponds to widely known personal information and recommending at least one more obscure reference or a randomly generated replacement. The parsing the user password can further include applying fuzzy matching or character-substitution detection to correlate segments to the user's personal data, even if spelled differently or partially masked. The providing feedback can include alerting the user if any segment corresponds to widely known personal information and recommending at least one more obscure reference or a randomly generated replacement.

The steps can further include adjusting the context-aware password strength rating over time, wherein the discoverability measures are updated upon detecting newly public user data or data breaches related to the user's personal information. The steps can further include enforcing a minimum context-aware password strength rating before accepting the user's password, wherein the user is prompted to modify any low-scoring segments until the rating exceeds a predefined threshold. The feedback can include educational content warning the user about reusing credentials, referencing personal interests, or employing predictable dates, so as to reduce susceptibility to targeted attacks. The steps can further include assigning a difficulty score based on computing a baseline score for each data point based on whether it appears in public records or on social media; adding a penalty if the data point appears in at least one compromised database or dark web listing; and increasing the score if the data point is detected only within private communications or encrypted backups.

The steps can further include collecting user-specific data from at least one public source and at least one private source to build an information graph, wherein the discoverability measures are derived by querying the information graph for each parsed segment to obtain difficulty scores. The information graph can be built by generating a plurality of nodes, each node corresponding to a piece of user-related data, and associating the nodes with edges that indicate relationships between the user and the pieces of data, the steps can further include assigning a difficulty score to each node based on at least one factor including source reliability, frequency of mention, recency of exposure in public or dark web data, or user's private or local context. The information graph cam be stored locally on a user device in an encrypted database, and wherein only authorized processes of a password context program can read or modify the difficulty scores.

The information graph can be distributed between a local component on a user device and a remote component on a server, and the steps can further include synchronizing difficulty scores or newly discovered data points between the local and remote components. The querying the information graph can include performing a graph-based search to locate any nodes whose content partially or fully matches each segment, and retrieving a corresponding difficulty score from the matching node. The steps can further include updating at least one node in the information graph based on newly discovered user data, and recalculating an associated difficulty score to reflect changes in accessibility or frequency of mention.

The at least one private source can be accessible via a user device and can include one of locally stored email archives, locally stored files (e.g., text/images/video/audio/etc.) text message logs, activity logs (e.g., Web activity logs, video watching logs, logs and answers from GenAI interactions, etc.), device backups, password manager metadata, and wherein the steps include filtering the at least one private source accessible via the user device to identify only personal references or keywords relevant to potential password creation. The collecting data from the at least one public source can include scraping at least one social media platform or data broker service for a user's posts, likes, friend lists, or mentions, and integrating discovered information into the information graph with a node-level timestamp.

Conclusion

In this disclosure, including the claims, the phrases "at least one of" or "one or more of" when referring to a list of items mean any combination of those items, including any single item. For example, the expressions "at least one of A, B, or C," "at least one of A, B, and C," "one or more of A, B, or C," and "one or more of A, B, and C" cover the possibilities of: only A, only B, only C, a combination of A and B, A and C, B and C, and the combination of A, B, and C. This can include more or fewer elements than just A, B, and C. Additionally, the terms "comprise," "comprises," "comprising," "include," "includes," and "including" are intended to be open-ended and non-limiting. These terms specify essential elements or steps but do not exclude additional elements or steps, even when a claim or series of claims includes more than one of these terms.

Although operations, steps, instructions, blocks, and similar elements (collectively referred to as "steps") are shown or described in the drawings, descriptions, and claims in a specific order, this does not imply they must be performed in that sequence unless explicitly stated. It also does not imply that all depicted operations are necessary to achieve desirable results. In the drawings, descriptions, and claims, extra steps can occur before, after, simultaneously with, or between any of the illustrated, described, or claimed steps. Multitasking, parallel processing, and other types of concurrent processing are also contemplated. Furthermore, the separation of system components or steps described should not be interpreted as mandatory for all implementations; also, components, steps, elements, etc. can be integrated into a single implementation or distributed across multiple implementations.

While this disclosure has been detailed and illustrated through specific embodiments and examples, it should be understood by those skilled in the art that numerous variations and modifications can perform equivalent functions or achieve comparable results. Such alternative embodiments and variations, even if not explicitly mentioned but that achieve the objectives and adhere to the principles disclosed herein, fall within the spirit and scope of this disclosure. Accordingly, they are envisioned and encompassed by this disclosure and are intended to be protected under the associated claims. In other words, the present disclosure anticipates combinations and permutations of the described elements, operations, steps, methods, processes, algorithms, functions, techniques, modules, circuits, and so on, in any conceivable order or manner—whether collectively, in subsets, or individually—thereby broadening the range of potential embodiments.

What is claimed is:

1. A method for providing context-aware password strength evaluation, the method comprising steps of:

receiving a user password, wherein the user password is associated with at least one of a newly created password, an updated password, or an existing password to be analyzed;

parsing the user password into one or more segments;

determining, for each segment, discoverability measures relative to personal information associated with the user, wherein the personal information includes at least one of publicly available data or non-public data;

calculating a context-aware password strength rating based on the discoverability measures of the one or more segments;

providing feedback to the user regarding the context-aware password strength rating; and collecting user-specific data from at least one public source and at least one private source to build an information graph, wherein the discoverability measures are derived by querying the information graph for each parsed segment to obtain difficulty scores, wherein the information graph is built by generating a plurality of nodes, each node corresponding to a piece of user-related data, and associating the nodes with edges that indicate relationships between the user and the pieces of data, and wherein the steps further include assigning a difficulty score to each node based on at least one factor including source reliability, frequency of mention, recency of exposure in public or dark web data, or user's private or local context.

2. The method of claim 1, wherein the calculating the context-aware password strength rating includes aggregating the discoverability measures through a scoring model that accounts for accounts password length, character diversity, and assigned difficulty scores based on the personal information.

3. The method of claim 1, wherein the providing feedback includes alerting the user if any segment corresponds to widely known personal information and recommending at least one more obscure reference or a randomly generated replacement.

4. The method of claim 1, wherein the parsing the user password further includes applying fuzzy matching or character-substitution detection to correlate segments to the user's personal data, even if spelled differently or partially masked.

5. The method of claim 1, wherein the providing feedback includes alerting the user if any segment corresponds to widely known personal information and recommending at least one more obscure reference or a randomly generated replacement.

6. The method of claim 1, wherein the steps further include adjusting the context-aware password strength rating over time, wherein the discoverability measures are updated upon detecting newly public user data or data breaches related to the user's personal information.

7. The method of claim 1, wherein the steps further include enforcing a minimum context-aware password strength rating before accepting the user's password, wherein the user is prompted to modify any low-scoring segments until the rating exceeds a predefined threshold.

8. The method of claim 1, wherein the feedback includes educational content warning the user about reusing credentials, referencing personal interests, or employing predictable dates, so as to reduce susceptibility to targeted attacks.

9. The method of claim 1, wherein the steps further include assigning a difficulty score based on:

computing a baseline score foreach data point based on whether it appears in public records or on social media;

adding a penalty if the data point appears in at least one compromised database or dark web listing; and increasing the score if the data point is detected only within private communications or encrypted backups.

10. The method of claim 1, wherein the information graph is stored locally on a user device in an encrypted database, and wherein only authorized processes of a password context program can read or modify the difficulty scores.

11. The method of claim 1, wherein the information graph is distributed between a local component on a user device and a remote component on a server, and the method further comprises synchronizing difficulty scores or newly discovered data points between the local and remote components.

12. The method of claim 1, wherein the at least one private source is accessible via a user device and includes one of:

locally stored email archives, locally stored files, text message logs, device backups, activity logs, password manager metadata, and wherein the steps further include filtering the at least one private source accessible via the user device to identify only personal references or keywords relevant to potential password creation.

13. The method of claim 1, wherein the collecting data from the at least one public source includes scraping at least one social media platform or data broker service for a user's posts, likes, friend lists, or mentions, and integrating discovered information into the information graph with a node-level timestamp.

14. A method for providing context-aware password strength evaluation, the method comprising steps of:

receiving a user password, wherein the user password is associated with at least one of a newly created password, an updated password, or an existing password to be analyzed;

parsing the user password into one or more segments;

determining, for each segment, discoverability measures relative to personal information associated with the user, wherein the personal information includes at least one of publicly available data or non-public data;

calculating a context-aware password strength rating based on the discoverability measures of the one or more segments;

providing feedback to the user regarding the context-aware password strength rating; and collecting user-specific data from at least one public source and at least one private source to build an information graph, wherein the discoverability measures are derived by querying the information graph for each parsed segment to obtain difficulty scores, wherein the querying the information graph includes performing a graph-based search to locate any nodes whose content partially or fully matches each segment, and retrieving a corresponding difficulty score from the matching node.

15. The method of claim 14, wherein the calculating the context-aware password strength rating includes aggregating the discoverability measures through a scoring model that accounts for accounts password length, character diversity, and assigned difficulty scores based on the personal information.

16. The method of claim 14, wherein the providing feedback includes alerting the user if any segment corresponds to widely known personal information and recommending at least one more obscure reference or a randomly generated replacement.

17. The method of claim 14, wherein the providing feedback includes alerting the user if any segment corresponds to widely known personal information and recommending at least one more obscure reference or a randomly generated replacement.

18. A method for providing context-aware password strength evaluation, the method comprising steps of:

receiving a user password, wherein the user password is associated with at least one of a newly created password, an updated password, or an existing password to be analyzed;

parsing the user password into one or more segments;

determining, for each segment, discoverability measures relative to personal information associated with the user, wherein the personal information includes at least one of publicly available data or non-public data;

calculating a context-aware password strength rating based on the discoverability measures of the one or more segments;

providing feedback to the user regarding the context-aware password strength rating;

collecting user-specific data from at least one public source and at least one private source to build an information graph, wherein the discoverability measures are derived by querying the information graph for each parsed segment to obtain difficulty scores; and updating at least one node in the information graph based on newly discovered user data, and recalculating an associated difficulty score to reflect changes in accessibility or frequency of mention.

19. The method of claim 18, wherein the calculating the context-aware password strength rating includes aggregating the discoverability measures through a scoring model that accounts for accounts password length, character diversity, and assigned difficulty scores based on the personal information.

20. The method of claim 18, wherein the providing feedback includes alerting the user if any segment corresponds to widely known personal information and recommending at least one more obscure reference or a randomly generated replacement.

* * * * *